(12) United States Patent
Stahl

(10) Patent No.: US 6,371,461 B1
(45) Date of Patent: Apr. 16, 2002

(54) ELASTIC BUSH WITH TWO ARMATURES; TORQUE TAKE UP CONNECTING ROD EQUIPPED WITH A BUSH OF THIS KIND

(75) Inventor: Manfred Stahl, Chateaudun (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/296,116

(22) Filed: Apr. 21, 1999

(30) Foreign Application Priority Data

Apr. 21, 1998 (FR) .............................................. 98 04962

(51) Int. Cl.⁷ .............................................. B60G 11/22
(52) U.S. Cl. .................................. 267/140.12; 267/293
(58) Field of Search ...................... 267/292, 293, 267/294, 140.11, 140.12, 140.13, 141.1, 141.2, 141.3, 281, 276

(56) References Cited

U.S. PATENT DOCUMENTS

| | | | | |
|---|---|---|---|---|
| 2,272,900 A | * | 2/1942 | Saurer ......................... 267/293 |
| 3,938,609 A | * | 2/1976 | Kensaku et al. | |
| 4,794,998 A | * | 1/1989 | Iwai et al. ................... 267/281 |
| 4,826,145 A | * | 5/1989 | Moore et al. ................ 267/293 |
| 4,840,359 A | * | 6/1989 | Hamaekers et al. ........ 267/292 |
| 4,889,328 A | * | 12/1989 | Uno et al. ................... 267/293 |
| 4,889,578 A | * | 12/1989 | Kei et al. ................. 267/141.2 |
| 5,026,090 A | * | 6/1991 | Sekino ......................... 267/276 |
| 5,031,885 A | * | 7/1991 | Schwerdt ..................... 267/281 |
| 5,299,788 A | * | 4/1994 | Kanda ..................... 267/140.12 |
| 5,411,287 A | * | 5/1995 | Henschen .................... 267/276 |
| 5,427,208 A | * | 6/1995 | Motobu et al. ............. 267/276 |
| 5,711,513 A | * | 1/1998 | Bretaudeau et al. ..... 267/140.12 |
| 5,865,429 A | * | 2/1999 | Gautheron ................ 267/141.2 |
| 6,003,888 A | * | 12/1999 | Godbersen ................... 267/276 |

FOREIGN PATENT DOCUMENTS

| | | |
|---|---|---|
| DE | 86 13 199.0 | 12/1986 |
| EP | 0 066 815 | 12/1982 |
| EP | 0 723 091 | 7/1996 |
| FR | 2 118 585 | 7/1972 |
| FR | 2 662 223 | 11/1991 |

* cited by examiner

Primary Examiner—Christopher P. Schwartz
Assistant Examiner—Robert A. Siconolfi
(74) Attorney, Agent, or Firm—Marshall, Gerstein, & Borun.

(57) ABSTRACT

The elastic bush for the end of a torsion bar C has on its inner armature 2 radial projections 2a to 2d between which are interleaved radial elastic arms 3 of a lining R bonded to the inside fact of the outer armature 1. The arms can be pre-stressed in compression in the spaces between two adjacent projections. Abutments 4a to 4d on the lining R are provided opposite the enlarged ends of the projections 2a to 2d to limit relative movement of the two armatures transversely to their axis in the direction X of the axis of the bar and in the perpendicular direction Z.

7 Claims, 2 Drawing Sheets

ELASTIC BUSH WITH TWO ARMATURES; TORQUE TAKE UP CONNECTING ROD EQUIPPED WITH A BUSH OF THIS KIND

The present invention concerns an elastic bush including two rigid armatures which are coaxial when unstressed, namely an outer armature and an inner armature between which there extend, essentially in a radial direction, a set of elastic arms that in principle are equi-angularly distributed.

It can be used, for example, but not exclusively, to form the end of a torsion bar which is connected to the engine or to the bodyshell of a vehicle in which the engine is mounted transversely.

FIG. 1 of the accompanying drawings shows a prior art connecting bush for use in an application of the above kind in cross-section.

The figure shows a tubular outer armature 1' and a tubular inner armature 2' which are coaxial when unstressed. In this example an elastic connection is provided between the two armatures by four equi-angularly distributed natural or synthetic rubber arms 31 whose ends are bonded to the inner armature 2' and to the inside face of the outer armature 1'. Part of the body C of a conventional torsion bar, for example for transversely mounted vehicle engines, is also shown.

When forces are applied to the bar axially, i.e. in the direction of the axis X, or when vertical forces are applied in the perpendicular direction represented by the axis Z, some of the arms 3' are subjected to tensile stresses, which reduces the durability of the elastic bush. One attempt to remedy this provides a constriction on the outer armature 1' to reduce the tension already present in the arms on removal from the mould, but the drawback referred to above remains.

The aim of the present invention is to remedy this drawback and to prevent the elastic arms from being stressed in tension during operation.

To this end, an elastic bush of the type mentioned above is characterised in that the elastic arms are bonded at their base to only one armature, their end opposite said base being between two adjoining rigid radial projections of the other armature.

As a result, forces acting in the directions X and Z (or the resultant of such forces) can stress each elastic arm only in compression, each elastic arm being guided and held between two adjoining rigid projections of the other armature. The arms opposite those on which compression forces are exerted are not subject to any force. They are subjected to compression forces only if the relative displacement of the two armatures is reversed and are never subjected to any tension force. There may be a clearance between said opposite end of each elastic arm and said other armature. If there is no such clearance, the arms are advantageously pre-stressed radially by compression of said opposite end against said other armature.

For good radial guidance of the elastic arms between the two adjoining rigid projections of the other armature it is possible for said rigid projections to have an enlarged free end, like the branches of a Maltese Cross, and for said elastic arms to have a cross-section that decreases in size from their base towards their opposite end, to impart to them the required elasticity as a function of the load.

To limit deformation of the bush under high loads the armature to which said elastic arms are bonded can have abutments between the arms facing the free ends of said rigid projections; for example, the armature to which said elastic arms are bonded can be bonded to an elastic material lining having radial extensions alternately constituting said elastic arms and said abutments, the abutments being significantly smaller in the radial direction than the elastic arms.

The abutments can have different thicknesses in the direction (X or Z) of the forces they are intended to withstand.

The elastic arms can in principle be bonded to the inner armature or to the outer armature but it is preferable for said arms to be bonded at their base only to the inside face of said outer armature, their end opposite said base extending between two adjoining rigid radial projections of the inner armature.

One such embodiment of the invention is shown by way of non-limiting example in FIG. 2 of the accompanying drawings, which is a view in cross-section analogous to that of FIG. 1 of an elastic bush in accordance with the invention constituting the end of a torsion bar with a solid inner armature (or insert);

Figure 1:
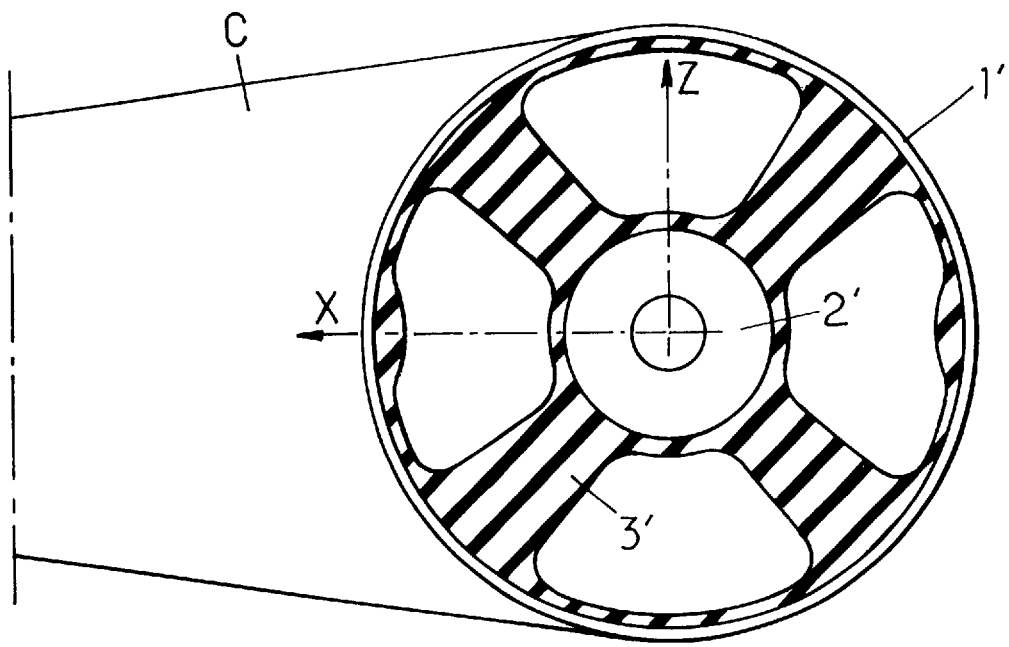
Figure 2:
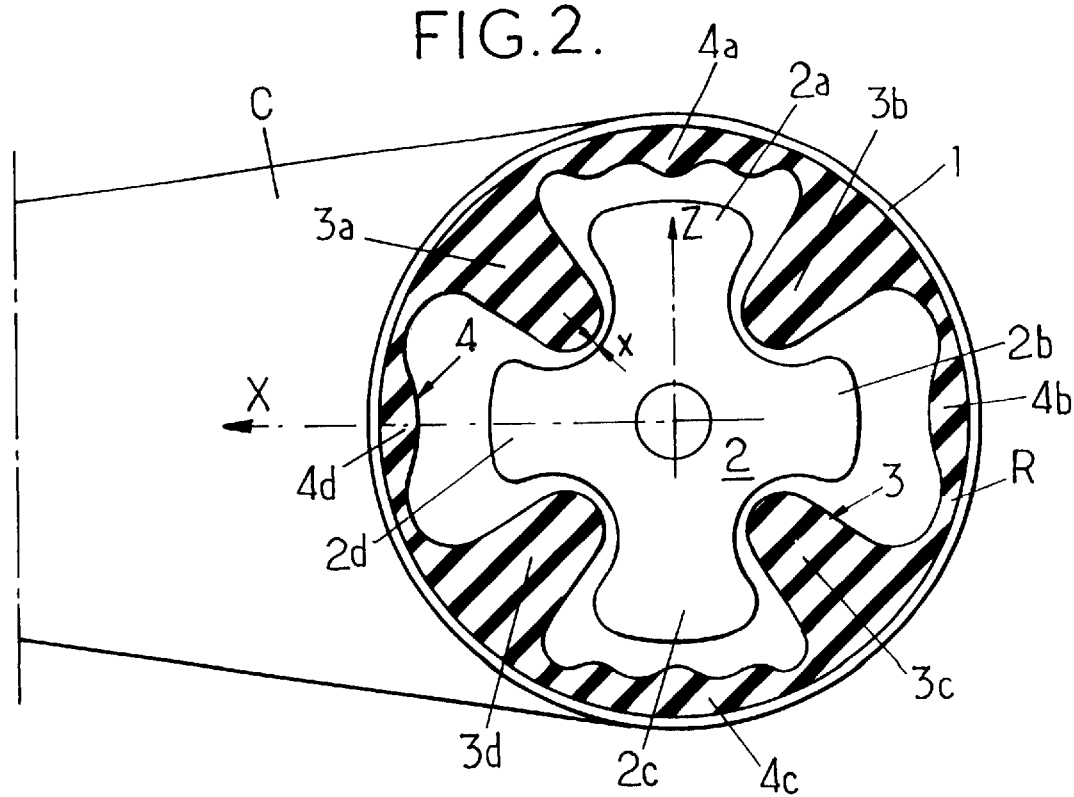

In FIG. 2, and by analogy with FIG. 1, the tubular outer armature is identified by reference numeral 1 and the inner armature is identified by reference numeral 2. The inner armature is solid and has four equi-angularly distributed radial projections 2 with enlarged ends 2a, 2b, 2c and 2d. The projections 2a and 2c have an axis in the direction Z and are slightly larger in the radial direction than the projections 2b and 2d which have an axis in the direction X, which is that of the axis of the bar and is perpendicular to the direction Z, which may be assumed to be vertical.

An elastic material, for example natural or synthetic rubber, lining R is bonded to the inside face of the outer armature 1 and has radial elastic arms 3, individually identified by reference numerals 3a, 3b, 3c and 3d, whose cross-section decreases in the direction towards their free end, alternating with abutments 4, individually identified by reference numerals 4a, 4b, 4c and 4d, in the form of localised increased thickness portions of the lining R.

The elastic arms are in respective spaces between two adjoining projections on the inner armature 2 and in this example there is a small clearance x between the end of each arm and the hollow or smallest diameter part of the inner armature. However, the clearance x could be eliminated or could even be a negative clearance, i.e. the elastic arms could be pre-stressed against the inner armature 2.

The abutments 4 facing the enlarged ends of respective projections 2 can have different heights: the abutments 4b and 4d respectively facing the enlarged ends of the projections 2b and 2d of the inner armature 2 can be thinner than the abutments 4a and 4c respectively facing the enlarged ends of the longer projections 2a and 2c. Accordingly the relative displacements allowed before abutting interengagement of the armatures 1 and 2 are greater in the direction X of the torque resisting forces of the bar C than in the vertical direction Z, in which the bush must only absorb vertical vibrations due to unevenness of the road.

As shown in FIG. 2, the thicker abutments 4a and 4c can have an undulating surface to make them more flexible.

Figure 3:
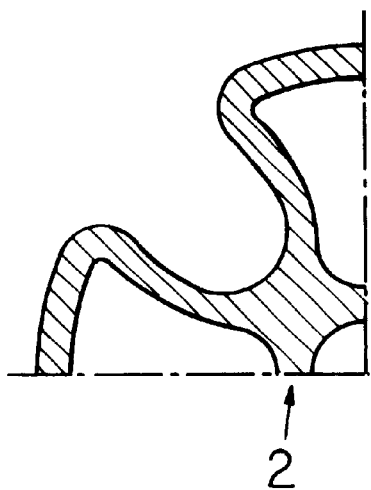
FIG. 3 is a quarter-view in cross-section of an extruded metal inner armature.

FIG. 3 shows that the inner armature 2 can be hollow and made of extruded metal, for example.

Figure 4A:
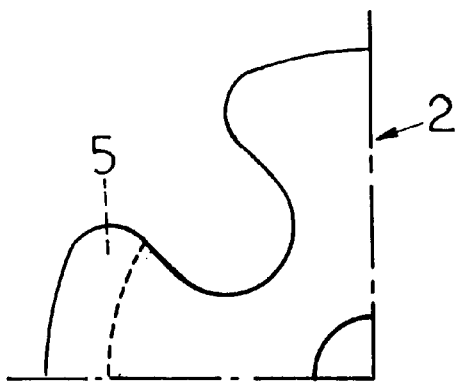
FIG. 4a is a partial end view of a solid inner armature.
Figure 4B:
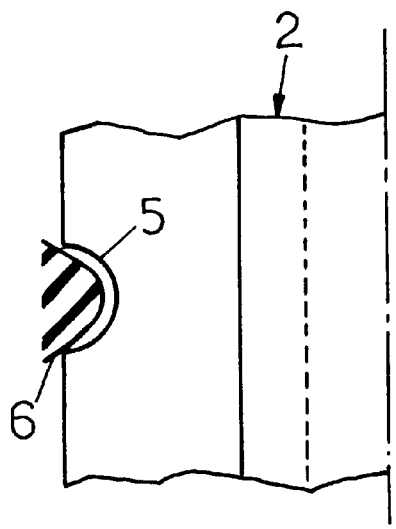
FIG. 4b is a partial top view of that armature.

FIGS. 4a and 4b show the possibility of providing on one of the projections of the armature 2 an axial re-entrant part or notch 5 which can accommodate a projecting part 6 of the lining R to locate the armatures 1 and 2 axially relative to each other. The converse arrangement could be provided (a re-entrant part on the lining R of the outer armature 1 and a projecting part on the inner armature 2). This would prevent the inner armature 2, which is not attached to the outer armature 1, from escaping before the bar is fitted.

What is claimed is:

1. An elastic bush including two rigid armatures which are coaxial when unstressed, namely an outer armature and an inner armature between which there extend, essentially in the radial direction, elastic arms which are in principle equi-angularly distributed, wherein the elastic arms (3) are bonded at their base to only one armature (1), their end opposite said base being between two adjoining rigid radial projections (2a to 2d) of the other armature (2), wherein the armature (1) to which said elastic arms are bonded includes abutments (4) between the arms facing the free ends of said projections (2a to 2d).

2. A bush according to claim 1, wherein an elastic material lining (R) having radial extensions (3, 4) alternately constituting said elastic arms and said abutments is bonded to the armature (1) to which said elastic arms (3) are bonded.

3. A torque take up connecting rod equipped with a bush according to claim 1, wherein said bush includes, on one armature (2), two projections (2b, 2d) oriented in the direction (X) of the longitudinal axis of the torque take up connecting rod (C) and two projections (2a, 2c) oriented in the direction (Z) perpendicular to the previous direction, wherein said projections (2b, 2d) oriented in said direction (X) of the longitudinal axis of the torque take up connecting rod (C) are smaller in the radial direction than the projections (2a, 2c) oriented in the direction (Z) perpendicular to the previous direction.

4. A torque take up connecting rod according to claim 3, wherein the abutments facing the free ends of the corresponding projections oriented in the direction of the longitudinal axis of the torque take up connecting rod are thinner than the abutments facing the corresponding projections (2a, 2c) oriented in the direction (Z) perpendicular to the previous direction.

5. A torque take up connecting rod equipped with a bush according to claim 1, wherein said bush includes, on one armature (2), two projections (2b, 2d) oriented in the direction (X) of the longitudinal axis of the torque take up connecting rod (C) and two projections (2a, 2c) oriented in the direction (Z) perpendicular to the previous direction, wherein the abutments (4b, 4d) facing the free ends of the corresponding projections (2b, 2d) oriented in the direction (X) of the longitudinal axis of the torque take up connecting rod (C) are thinner than the abutments (4a, 4c) facing the corresponding projections (2a, 2c) oriented in the direction (Z) perpendicular to the previous direction.

6. A torque take up connecting rod according to claim 5, wherein the abutments (4a, 4c) facing the corresponding projections (2a, 2c) oriented in the direction (Z) perpendicular to the previous direction have an undulating surface.

7. An elastic bush including two rigid armatures which are coaxial when unstressed, namely an outer armature and an inner armature between which there extend, essentially in the radial direction, elastic arms which are in principle equi-angularly distributed, wherein the elastic arms (3) are bonded at their base to only one armature (1), their end opposite said base being between two adjoining rigid radial projections (2a to 2d) of the other armature (2), wherein one armature (2) has a re-entrant part (5) adapted to co-operate with a projecting part (6) of the other armature (1) for relative axial location of the two armatures (1, 2).

* * * * *